(12) United States Patent
Benke et al.

(10) Patent No.: US 9,996,563 B2
(45) Date of Patent: *Jun. 12, 2018

(54) EFFICIENT FULL DELETE OPERATIONS

(71) Applicant: International Business Machines Corporation, Armonk, NY (US)

(72) Inventors: Oliver Benke, Stuttgart (DE); Johannes S. Kern, Boeblingen (DE); Daniel Martin, Stuttgart (DE); Knut Stolze, Jena (DE)

(73) Assignee: International Business Machines Corporation, Armonk, NY (US)

( * ) Notice: Subject to any disclaimer, the term of this patent is extended or adjusted under 35 U.S.C. 154(b) by 524 days.

This patent is subject to a terminal disclaimer.

(21) Appl. No.: 14/665,232

(22) Filed: Mar. 23, 2015

(65) Prior Publication Data

US 2016/0283528 A1    Sep. 29, 2016

(51) Int. Cl.
*G06F 7/00*  (2006.01)
*G06F 17/00* (2006.01)
*G06F 17/30* (2006.01)

(52) U.S. Cl.
CPC .. *G06F 17/30303* (2013.01); *G06F 17/30339* (2013.01); *G06F 17/30371* (2013.01); *G06F 17/30377* (2013.01)

(58) Field of Classification Search
CPC ......... G06F 17/30303; G06F 17/30339; G06F 17/30371; G06F 17/30377; G06F 12/1009; G06F 12/1027
See application file for complete search history.

(56) References Cited

U.S. PATENT DOCUMENTS

| 7,756,821 | B2 | 7/2010 | Havens et al. | |
|---|---|---|---|---|
| 2004/0083240 | A1* | 4/2004 | Sekine | G06F 17/30575 |
| 2006/0095399 | A1* | 5/2006 | Murakami | G06F 17/30067 |
| 2011/0320419 | A1 | 12/2011 | Johnston et al. | |
| 2013/0124466 | A1* | 5/2013 | Naidu | G06F 17/30575 |
| | | | | 707/610 |
| 2014/0280029 | A1 | 9/2014 | Ding et al. | |

OTHER PUBLICATIONS

U.S. Appl. No. 15/042,466, filed Feb. 12, 2016, Entitled "Efficient Full Delete Operations", 42 Pages.
List of IBM Patents or Patent Applications Treated As Related, Filed 02/12/16, 2 Pages.

* cited by examiner

*Primary Examiner* — Azam M Cheema
(74) *Attorney, Agent, or Firm* — Edward J. Wixted, III

(57) ABSTRACT

In an approach for processing data in a database management system, a processor performs a delete operation on a first data container, wherein the first data container includes one or more data records and wherein the delete operation logically deletes at least one data record of the one or more data records. A processor associates a time of the performed delete operation with the first data container. A processor performs a write operation on a first data record of the first data container. A processor associates a time of the performed write operation with the first data record of the first data container. Responsive to receiving a database query directed at the first data container, a processor grants access to the first data record of the first data container based on, at least, the time of the performed write operation being chronologically after the time of the performed delete operation.

18 Claims, 3 Drawing Sheets

EFFICIENT FULL DELETE OPERATIONS

BACKGROUND

The present invention relates to database management systems, and more specifically, to delete operations performed by database management systems.

Some database management systems update each row of a table with a marker in order to indicate that the marked rows should be considered as deleted. The scanning process and the computational overhead for processing the markers may result in slow performance of full table deletes.

The performance of full delete operations of many analytical systems may be slow because analytical systems commonly are performance-optimized for analytical queries and processing tasks, not for mass deletes. In particular, full delete operations in database management systems providing snapshot isolation, as for example in multiversion concurrency control (MVCC) systems, tend to be slow because such systems scan every single row of the table, including inspection of records which are already logically deleted, in order to perform a full delete operation. Deletes of individual rows may result in poor performance in such systems while a full table delete may result in a blocking of subsequent write transactions and thus, may block and conflict with analytical and/or other tasks to be performed. For example, a re-load typically cannot start before the full table delete has been completed.

SUMMARY

Aspects of an embodiment of the present invention disclose a method, computer program product, and computer system for processing data in a database management system. A processor performs a delete operation on a first data container, wherein the first data container includes one or more data records and wherein the delete operation logically deletes at least one data record of the one or more data records. A processor associates a time of the performed delete operation with the first data container. A processor performs a write operation on a first data record of the first data container. A processor associates a time of the performed write operation with the first data record of the first data container. Responsive to receiving a database query directed at the first data container, a processor grants access to the first data record of the first data container based on, at least, the time of the performed write operation being chronologically after the time of the performed delete operation.

BRIEF DESCRIPTION OF THE DRAWINGS

In the following, embodiments of the invention are explained in greater detail, by way of example only, making reference to the drawings in which.

DETAILED DESCRIPTION

The present invention will now be described in detail with reference to the Figures.

Figure 1:
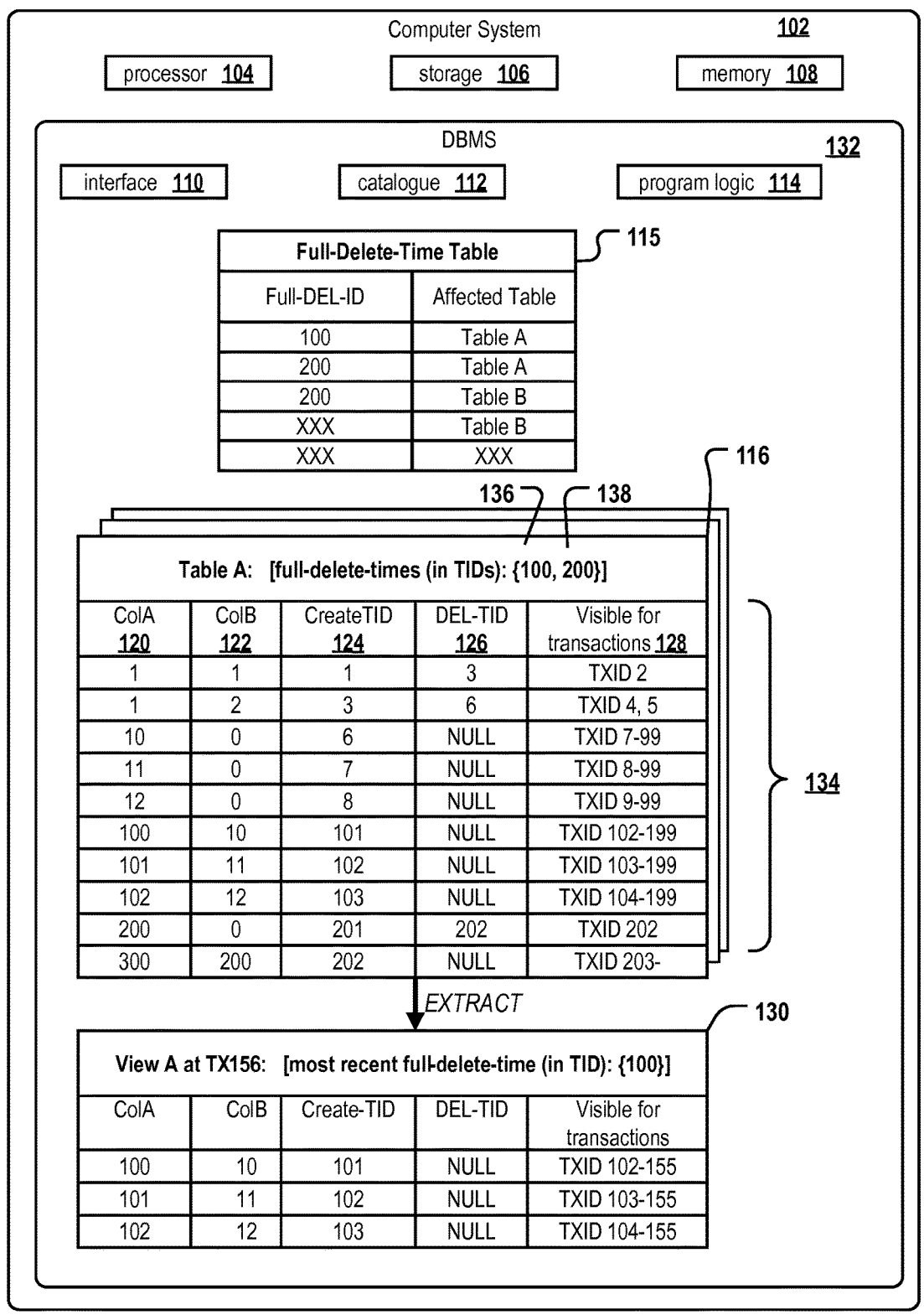
FIG. 1 depicts a computing system, including a database management system, according to an embodiment of the present invention.

FIG. 1 depicts a computer system, designated 102, in accordance with one embodiment of the present invention. FIG. 1 depicts a block diagram of components of computer system 102, in accordance with an illustrative embodiment of the present invention. It should be appreciated that FIG. 1 provides only an illustration of one implementation and does not imply any limitations with regard to the environments in which different embodiments may be implemented. Many modifications to the depicted environment may be made.

Computer system 102 may be a management server, a web server, or any other electronic device or computing system capable of receiving and sending data, and processing program instructions. In some embodiments, computer system 102 may be a laptop computer, tablet computer, netbook computer, personal computer (PC), a desktop computer, or any programmable electronic device.

Computer system 102 includes database management system (DBMS) 132, according to an embodiment of the invention. DBMS 132 includes first data container 116, which includes a plurality of data records 134. First data container 116 may be, for example, a database table or a partition of a database table. DBMS 132 also includes interface 110 for receiving a database query. Interface 110 may be, for example, a Structured Query Language (SQL) interface. DBMS 132 also includes program logic 114. Program logic 114 may be configured for: upon performing a write operation on first data container 116 which creates or modifies one of the data records of first data container 116, storing a current time as a create-time (see FIG. 1, column 124) in association with said data record (see FIG. 2, step 202); upon performing a full delete operation on first data container 116 which deletes the complete data content of first data container 116, storing a current time as a full-delete-time (e.g., full-delete-time 136, 138) in association with first data container 116, the full-delete-time being stored in the form of a single data value per full delete operation and per first data container 116 whose data content was fully deleted (see FIG. 2, step 204); and in response to receiving a database query directed at first data container 116, evaluating the one or more single-valued full-delete-times, such as full-delete time 136, 138, associated with first data container 116 and selectively giving the received database query access to the data records of data records 134 contained in first data container 116 whose assigned create-time is later than the most recent full-delete-time stored in association with first data container 116. For example, the selective giving of access to a data record, such as a data record from data records 134, may comprise allowing a read and/or write operation to become aware of the existence of the data record and to analyze the data content of the data record. The read and/or write operation may have been requested, for example, by a client computer (not shown). For example, the received database query may be a SELECT, UPDATE or DELETE statement.

Figure 2:
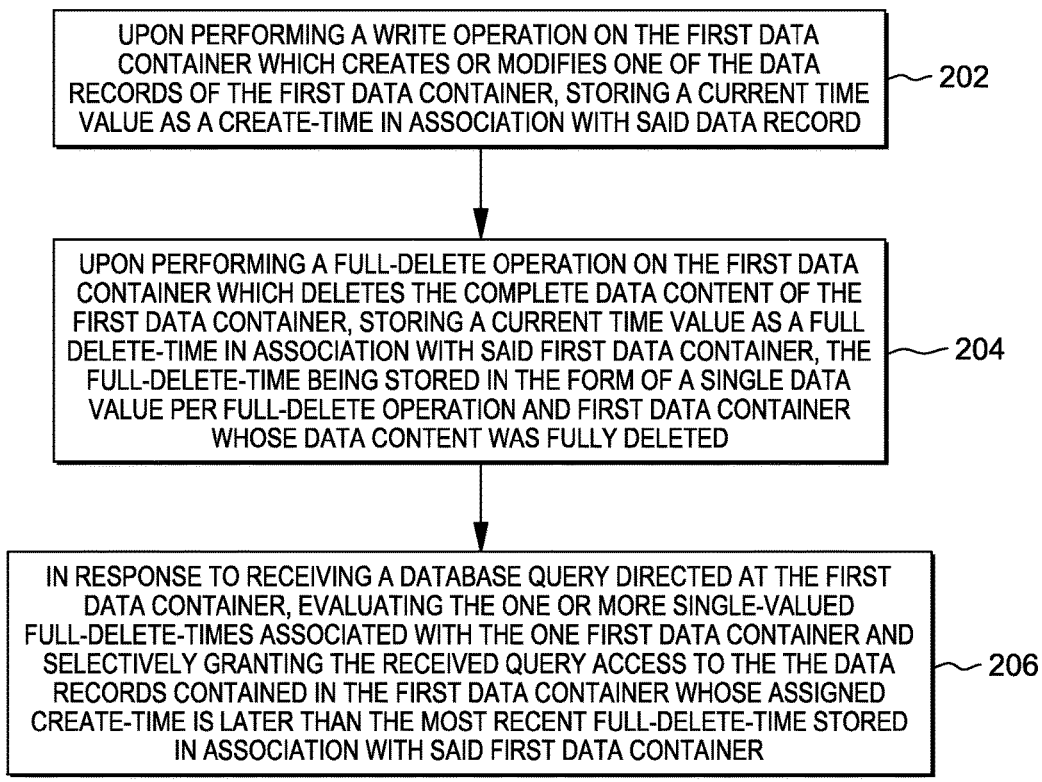
FIG. 2 depicts a computer-implemented method according to an embodiment of the present invention.

FIG. 2 depicts a flowchart of program logic 114, for operating a DBMS (e.g., DBMS 132) according to an embodiment of the invention. For example, the DBMS may be implemented as DBMS 132 as depicted in FIG. 1. DBMS 132 is configured for managing first data container 116. First data container 116 comprises a plurality of data records 134.

In step 202, upon performing a write operation on first data container 116 which creates or modifies one of the data records of the plurality of data records 134 of first data container 116, program logic 114 stores a current time as a create-time (see FIG. 1, column 124) in association with said data record.

In step 204, upon performing a full delete operation on first data container 116 which deletes the complete data content of first data container 116, program logic 114 stores a current time as a full-delete-time (e.g., full-delete-time 136, 138) in association with first data container 116. In some embodiments, the full-delete-time (e.g., full-delete-time 136, 138) is stored in the form of a single data value per full delete operation and per first data container 116 whose data content was fully deleted.

In step 206, in response to receiving a database query directed at first data container 116, program logic 114 evaluates the one or more single-valued full-delete-times (e.g., 136, 138) associated with first data container 116 and selectively gives access to the data records, of the plurality of data records 134, contained in first data container 116 whose assigned create-time is later than the most recent full-delete-time (e.g., 138) stored in association with first data container 116.

For example, the received database query may be a read SQL query (e.g., a SELECT statement) or a write SQL query (e.g., an UPDATE, INSERT, or DELETE statement). The database query will be prohibited by DBMS 132, or program logic therein, from accessing and recognizing the existence of a particular data record if the create time of said data record indicates that said data record was created before the most recent full delete operation performed on said data container (e.g., first data container 116).

A full delete functionality may be provided by DBMS 132, or program logic therein, which may be capable of quickly prohibiting access to a huge plurality of data records (e.g., all data records, such as the plurality of data records 134, stored in a data container, such as first data container 116) by merely storing a single data value in association with first data container 116 on which the full delete functionality was performed. It is not necessary to mark individual data records as "deleted" or "invisible". The time required for storing a single data value being indicative of the most recent full-delete-time will block subsequent transactions for a period of time.

First data container 116 may be, for example, a database table. In such an embodiment, the full delete operation is a full-table delete operation selectively performed on first data container 116.

Alternatively, first data container 116 may be a database table partition. In such an embodiment, the full delete operation is a full-partition delete operation selectively performed on first data container 116. DBMS 132 may comprise some data containers that are database tables and other data containers that are database table partitions and DBMS, or program logic therein, may be capable of performing both full-table delete operations as well as full-table partition delete operations. Tables whose data content shall be deleted may be identified by a table identifier and partitions may be identified by partition identifiers.

According to some embodiments, a full delete operation may be triggered by a full table refresh command or a full partition refresh command, by a TRUNCATE statement or by a DELETE FROM TABLE statement lacking a WHERE clause. According to some embodiments, the DELETE FROM TABLE statement is implemented in the same way as the TRUNCATE statement. In both cases, for example, a process (e.g. a GROOM TABLE process) for physically deleting unused, logically deleted data records may be executed after the logical full delete process. The process for physical deletion is executed asynchronously to the full delete operation. In both cases, the physical delete operation may be performed without blocking any transaction for a significant amount of time. This is different from current TRUNCATE implementations which—as it is a data definition language (DDL) statement to empty the complete table—forces the transaction issuing the TRUNCATE to wait until all other currently running transactions currently using that table have completed their respective work, something that can take a very long time if the transaction using the table is doing analytics work, using long-running (or broken) transactions, as often the case on online analytical processing (OLAP)-optimized systems.

According to preferred embodiments, the full delete operation is a logical delete operation which does not physically remove the data of the affected data records. After having performed the full delete operation, DBMS 132 may treat all data records whose create-time is older than the most recent full-delete-time, as logically deleted data records. Thus, a more efficient implementation for full table or full partition delete commands may be provided for rapidly logically deleting data records.

According to some embodiments, each full delete operation and the storing of the full-delete-time 136 of said full delete operation is executed within a respective full-delete transaction. DBMS 132 performs each full-delete transaction in the event that a read or write statement of a transaction, which has started execution on the first data container before the start of the full-delete transaction, is concurrently performed on the first data container. Thus, the full delete transaction is not delayed until all preceding transactions have commenced but rather may start executing immediately. The full delete operation is a logical delete operation having an effect only on the accessibility ("visibility") of data records for database queries succeeding the full delete operation. The concurrently performed read or write statements remain unaffected by any change of the most current full-delete-time (e.g., full-delete-time 138) assigned to first data container 116. In some embodiments, the storing of a new full-delete-time (e.g., full-delete time 136, 138) in association with first data container 116 may not interfere with, or affect the result of, any previously started and currently still ongoing transaction that reads data from or writes data to first data container 116. The decision as to which data records can be accessed and which are visible to said previously started transaction depends on a previously stored full-delete-time (e.g., full-delete-time 136, 138) of a previously performed full delete operation of first data container 116, said previously stored full-delete-time (e.g., full-delete-time 136, 138) being the most recent full-delete-time at the moment when said previously started and still ongoing transaction started executing. Transactional data consistency may be ensured without having to delay the full delete operations until all ongoing transactions operating on the same first data container (e.g., first data container 116) as the full delete operation have committed. Uncommitted transactions can continue to work on old data while, and even after, the full delete operation is being performed on first data container 116, because DBMS 132 grants or denies access to records of the first data container (e.g., by allowing or prohibiting an SQL statement to become aware of the existence of a particular data record, i.e., to "see" said data record) in dependence on the previously stored full-delete-time (e.g., full-time-delete 136, 138). Thus, the full delete operation involving a storing of a current time as the most current full delete time may start without any delay caused by the still ongoing transactions, whereby transactional consistency may still be provided.

For example, a load transaction "TL" filling a table "test_table" with 1 billion records may have started executing at time "t1," another transaction comprising a select statement on said "test_table" may have started at time "t2" and a further transaction comprising a full delete statement may have started executing at time "t3," whereby time point "t1" may lie before "t2" and time point "t2" may lie before "t3." Embodiments of the present invention recognize that with current technology, the full delete cannot start working before the load transaction has finished, as the full delete needs to mark all rows inserted by the load transaction. In some embodiments of the present invention, the full delete statement can start immediately and can operate concurrently to the load and SELECT operations without conflicts with respect to transactional consistency. The load transaction can continue to insert rows: the rows may have assigned, for example, the transaction-ID of the load-transaction, or the start time "t1" of the load transaction as respective create-times "t1." As "t1" is before "t3," they are accessible ("visible") by the succeeding SELECT transaction starting at t2 and are accessible ("visible") by the succeeding full delete statement starting at "t3" but not accessible ("visible") by any transaction starting after the start of the full delete transaction. For consistency, program logic, such as program logic 114, may require that the second transaction with the SELECT statement does not start before the load transaction finished (potentially a long time), and that any transaction starting after the starting time "t3" of the full delete transaction cannot start execution before the full-table-delete statement has committed, which may be quickly, as only a single data value needs to be stored. The full-table-delete operation allows a user and/or program logic, such as program logic 114, to "mark" rows as logically deleted which are not yet inserted, while currently running transactions continue to work with the older transaction ID.

According to some embodiments, the current time used as the full-delete-time (e.g., full-delete-time 136, 138) is a clock time determined by a clock when performing the full delete operation. The current time used as the create-time is a clock time determined by the clock when performing the write operation (e.g., an INSERT or UPDATE statement). According to embodiments, in particular in symmetric multiprocessing (SMP) or cluster environment, various means and mechanisms known in the art (e.g. a shared main memory (e.g., memory 108), accessible by all I/O devices (not shown) which are controlled by a single operating system instance that manages all processors (e.g., processor 104) of the system (e.g., computer system 102)) are employed to guarantee that the clocks in the cluster are synchronized and that individual processor cores (e.g., individual processor cores of processor 104) generate unique time stamps when determining a current time, even if running in parallel. For example, the current time used as the full-delete-time may be a clock time determined by a clock when starting a transaction comprising the full delete operation. The current time used as the create-time may be a clock time determined by a clock when starting a transaction to perform an INSERT, UPDATE or load operation that will create or update said data record in the database.

According to alternative embodiments, the current time used as the full-delete-time (e.g., full-time-delete 136, 138) is a transaction-ID of a full-delete transaction within which the full delete operation is performed. The current time used as the create-time is a transaction-ID of a database transaction which created or modified the data record. The transaction-IDs of transactions which are managed by DBMS 132 (including full-delete transactions and transactions creating, reading, or modifying a data record) are chronologically ordered and unique numbers.

According to alternative embodiments, the approach includes: in response to receiving the database query directed at first data container 116, creating second data container 130. Second data container 130 may not include any data initially. For example, second data container 130 could be an additional database table, a materialized view, or a database view. The approach may also include extracting data records whose assigned create-time-values are later than the most recent full-delete-time (e.g., full-delete-time 138) stored in association with first data container 116 from first data container 116, and using second data container 130 for returning the extracted data. For example, in an embodiment where second data container 130 is a view, the extraction and the returning of the data via second data container 130 may be implemented such that the database query for which second data container 130 was created is executed on second data container 130 (the view). Thereby, said view may be called, and the executed view may retrieve the data records which have not been logically deleted (i.e., rendered inaccessible). The retrieved data records are, for example, returned to a client. Alternatively, if a further database table or a materialized view is used as second data container 130, the extracted data may be temporarily stored in second data container 130 and may be returned from temporal storage (e.g., storage 106). In some embodiments, the approach also includes selective giving of access, by program logic, to the data records of the plurality of data records 134 whose assigned create-time-values are earlier than the most recent full-delete-time (e.g., full-delete-time 138) stored in association with first data container 116. This may include rewriting the received database query such that the rewritten database query accesses second data container 130 instead of first data container 116, and executing the rewritten database query instead of the received database query.

For example, in order to selectively grant or deny access to a particular data record of the plurality of data records 134 in first data container 116 at which the query is directed, DBMS 132 automatically executes, in response to receiving the database query, the following SQL statement: "CREATE VIEW container2view AS SELECT*FROM TABLE container1table WHERE create-time>=full-delete-time". Second data container 130, the view container2view will lack data records having been logically deleted by the full delete operation.

According to some embodiments, in particular embodiments where DBMS 132 provides for MVCC functionality, in order to selectively grant or deny access to a particular data record in the first data container, DBMS 132, or program logic therein, automatically executes, in response to the receiving of the database query, the following SQL statement: "CREATE VIEW container2view AS SELECT*FROM TABLE container1table WHERE
create-time>=full-delete-time AND
(record-delete-time IS NULL OR
record-delete-time> query-exec-time)".

The "query-exec-time" may indicate a moment when DBMS 132, having received the query (e.g., a SELECT statement), creates a transaction that comprises one or more statements implementing said query, the transaction being scheduled for execution by DBMS 132. For example, the query execution time "query-exec-time" can be the transaction-ID of a transaction by which the received query is performed. Alternatively, the "query-exec-time" may be the start time of a transaction whose execution is triggered by the received query. The received database query can, for example, be automatically rewritten by DBMS 132, such that the rewritten query accesses the created second data container 130 instead of first data container 116. For example, if the received database query is "SELECT zipcode from container1table WHERE name='Miller'", the rewritten query may be "SELECT zip-code from container2view WHERE name='Miller'".

If second data container 130 is a view, program logic, e.g., stored SQL queries, may be capable of retrieving a result from first data container 116, whereby a client may be enabled to query the view (i.e., second data container 130) in the same way that the client might query first data container 116. For example, the view (i.e., second data container 130) may "show" the same column number and names as first data container 116 when presented to the client. Program logic of said view may comprise a SELECT statement which is capable of selectively retrieving data records from first data container 116 whose assigned createtime is earlier than the most recent full-delete-time (e.g., full-delete-time 138) stored in association with first data container 116. Said SELECT statement may be created dynamically when creating second data container 130 by evaluating and using the full-delete-time of the full delete operation having been executed on first data container 116 most recently. Thus, a view used as second data container 130 is a "virtual table" computed or collated dynamically to allow the rewritten database query to be performed on the view. Changes applied to the data in first data container 116 after the view was created are reflected when a newer version of the view (the second data container) is created, in response to a subsequent database query.

In some embodiments, subsequently executed physical delete operations are executed on first data container 116. If second data container 130 is implemented as (a not materialized) database view, a physical delete operation for said view may not be necessary as said view does not comprise a physical copy of the data records of first data container 116. However, as the views are created de novo upon each receipt of a database query, DBMS 132 may delete old views after a period of time.

First data container 116 can be, for example, a table partition. Each table partition may have an assigned partition-ID and may be assigned a full-delete-time (e.g., fulldelete-time 136, 138), whereby the full-delete-times of the different partitions of a particular database table may be identical to, or may differ from, one another. In one embodiment, if second data container 130 is created in this scenario, DBMS 132 may execute the following command: "CREATE VIEW container2view AS SELECT*FROM TABLE container1table WHERE (partition-ID=1 and create-time>=full-delete-time-partition-1) OR (partition-ID=2 and create-time>=full-delete-time-partition-2) OR (partition-ID=3 and create-time>=full-delete-time-partition-3) OR

[ . . . ]

(partition-ID=n and create-time>=full-delete-time-partition-n).

In other embodiments, DBMS 132 may execute the following command: "CREATE VIEW container2view AS SELECT*FROM TABLE container1table WHERE (partition-ID=1 and create-time>=full-delete-time-partition-1 AND IDRDC*) OR (partition-ID=2 and create-time>=full-delete-time-partition-2 AND IDRDC*) OR (partition-ID=3 and create-time>=full-delete-time-partition-3 AND IDRDC*) OR

[ . . . ]

(partition-ID=n and create-time>=full-delete-time-partition-n AND IDRDC*).

The expression IDRDC is a parameter "individual data record delete condition". IDRDC is true if (record-deletetime IS NULL OR record-delete-time> query-exec-time").

In one example, a database table may be partitioned by date, such that there is one partition per month, or according to any other partition criteria. DBMS 132 may automatically generate, upon receiving or executing a command for a full table delete on a partitioned database table, a plurality of full delete commands, respectively being directed on the different partitions of said partitioned database table. Thus, the full table delete statement may be executed in the form of a plurality of full partition delete operations, whereby DBMS 132 automatically determines if a database table is partitioned and automatically generates a plurality of full partition delete statements from a single full table delete statement, if necessary.

It is also possible that a delete statement, having some select criteria, may be transformed into one or more full partition delete statements, affecting only a subset of the available partitions of said table. For example, if the table is partitioned by date, such that there is one partition per month, and DBMS 132 receives a query to delete all data records older than one year, DBMS 132 may automatically identify the subset of partitions comprising data records older than one year and DBMS 132 will create full partition delete statements selectively directed at said identified partitions.

According to embodiments, second data container 130 is created only if the received database query is, or comprises, a read operation on a data record of first data container 116. A read operation is a statement that reads data of data records, either for returning said data or for identifying the data to be updated or deleted. For example, an SQL SELECT statement is such a read operation. An UPDATE statement and a DELETE statement are each "read operations" within said meaning as each operation requires an identification of the data record on which said statement shall be performed. Thus, a SELECT, UPDATE or DELETE statement may be capable of triggering the creation of second data container 130. An SQL INSERT statement, however, is not a read operation according to the above specified meaning of said term. An INSERT statement may thus be executed directly on first data container 116 and may not trigger the creation of second data container 130. Performing INSERT statements on the first data container may ensure that newly added data is not lost as the data is always stored in the "base" container.

In the depicted example, first data container 116 comprises columns 120, 122, 124, 126, 128. Some columns, such as columns 120 and 122, may include user data or any other kind of data. A further column, column 124, may include the create-times of data records of the plurality of data records 134 (e.g., transaction-IDs of transactions having created said data records). A further column, column 126, may comprise a delete-time of data records of the plurality of data records 134 which were individually deleted (e.g., deleted by a DELETE SQL statement). In some embodiments, column 128 may not actually be a column of the table 116. In the depicted embodiment, column 128 is depicted to illustrate which transactions will be able to access, and therefore "see," a particular data record in dependence on said data records' create-time, said data records' delete-time, if any, and in dependence on the execution time of a current transaction (indicated by said transaction's ID) and in dependence on the most recent full-delete-time 138 stored in association with first data container 116.

In some embodiments, the transaction-IDs of the transaction are ordered chronologically, e.g., a transaction having transaction-ID TXID102 is ordered before and is older than a transaction having transaction-ID TXID200.

According to some embodiments, read-only transactions (e.g. transactions merely comprising one or more SELECT statements) may not be assigned a chronologically ordered, unique transaction-ID, because read-only transactions will not amend the create-time of any existing data record of the plurality of data records 134 and will also not result in the insertion of new data records. Thus, multiple read-only transactions may use the same transaction IDs, as each read-only transaction may have the same view on the database table contents. This may be advantageous, because less unique transaction-IDs have to be generated and managed and thus, less memory is consumed by the transaction-IDs. This is particularly advantageous in a context where a shared main memory (e.g., memory 108) accessible by all I/O devices (not shown) which are controlled by a single operating system instance that manages all processors (e.g., processor 104) of the system (e.g., computer system 102) is used for synchronizing the clocks in a distributed system, because the main memory in such systems is often occupied to its capacity.

For example, a query for accessing some data records of first data container 116 may be received by DBMS 132. DBMS 132 executes said query in transaction TX156 (not shown). DBMS 132 may automatically, in response to receiving the query, generate second data container 130, which may, in some embodiments, be a database view, which selectively includes those data records of the plurality of data records 134 having a create-time being later than the most recent full delete operation and which were not individually deleted by a DELETE statement. For example, at the time of TX156, the most recent full delete operation was performed by transaction TX100 (see FIG. 1, full-delete-time table 115).

According to embodiments, the full-delete-time of each full delete operation performed on first data container 116 is stored as part of the schema definition of second data container 130, created during a respective full delete operation. Relevant information on a particular first data container 116 may be stored as part of the metadata of the respective second data container 130, which may ease maintenance of the database.

According to the example presented above, where second data container 130 is represented as container2view, the full-delete-time (e.g., full-delete-time 136, 138) can be stored, for example, as part of the schema definition of the view container2view. A full delete operation may change the view definition by using a current time, e.g. a transaction-ID of the transaction that currently performs the full delete operation, for the "full-delete-time" constant in the view. Not a single data record of the first data container container1table needs to be modified or flagged as "deleted" in order to accomplish a logical delete operation for the data records.

According to alternative embodiments, DBMS 132 comprises at least one full-delete-time table 115. Full-delete-time table 115 is a separate database table that stores full-delete-times, such as full-delete-time 136 and full-delete-time 138, of one or more first data containers (e.g., first data container 116). Full-delete-time table 115 includes, for each of the one or more first data containers (e.g., first data container 116), one or more single-valued full-delete-times assigned to said first data container. Each full-delete-time is indicative of a time when a full delete operation was performed on the first data container (e.g., first data container 116) assigned to said full-delete time. The full-delete-time of first data container 116 is stored in full-delete-time table 115. The extraction of data records whose assigned create-times are later than the most recent full-delete-time of first data container 116 may be accomplished by performing a SELECT statement. The SELECT statement reads the most recent full-delete-time assigned to first data container 116 from full-delete-time table 115 and uses the read most recent full-delete-time (e.g., full-delete-time 138) for selectively reading all data records whose assigned create-time-values are later than the read most recent full-delete-time from first data container 116. Storing the full-delete-times in a separate table (e.g., full-delete-time table 115) may help avoid computational overhead associated with performing DDL statements necessary for modifying the metadata of a data container in database catalogue 112. Database catalogue 112 is a component of DBMS 132 that includes metadata in which definitions of database objects such as base tables, views, synonyms, value ranges, indexes, users, and user groups are stored. Also, interference of DDL or DML statements concurrently accessing first data container 116 and the schema definition of first data container 116 may be avoided.

According to the example presented above, where a container2view is created as second data container 130, the full-delete-time could be stored as a single data value as part of separate data container, e.g., table "full-delete-time table". Full-delete-time table 115 may also store the full-delete-times of other first data containers (e.g., first data containers other than first data container 116).

For example, second data container 130 may be created by a command: "CREATE VIEW container2view AS SELECT*FROM TABLE container1table WHERE create-time>=(SELECT full-delete-time from full-delete-time-table WHERE tablename='container1table')'". According to other embodiments, the following SQL statement is executed: "CREATE VIEW container2view AS SELECT*FROM TABLE container1table WHERE
   create-time>=(SELECT full-delete-time from full-delete-time-table WHERE tablename='container1table) AND
   (record-delete-time IS NULL OR
   record-delete-time> query-exec-time)".

According to alternative embodiments, the selective granting of access to data records of the plurality of data records 134 whose assigned create-time-values are later than the most recent full-delete-time stored in association with first data container 116 includes: in response to receiving a database query, reading the single data value indicating the time of the most recent full delete operation performed on first data container 116; rewriting the received database query such that the rewritten database query comprises an additional condition that has to be met by a data record for being accessible to the received query, the additional condition being the condition that the create-time stored in association with said data record must be later than the most recent full delete operation indicated by the read single data value; and executing the rewritten database query instead of the received database query.

For example, the received query having the transaction-ID 500 (not shown) may comprise the statement: "SELECT name from customer where zip-code is "12345". The most recent full-delete may have been made at a transaction-ID=200 (see FIG. 1, full-delete-time table 115). Thus, the data records having assigned a create-time between 1 and 199 should be considered as logically deleted and should not be visible to a client. To achieve this, in one embodiment, the above command is rewritten by DBMS 132 to the following statement: "SELECT name from customer where zip-code="12345" and create-time<200". Thus, DBMS 132 will return only data records having been created by a transaction having a transaction-ID less than 200. In some embodiments, the original statement may be rewritten to "SELECT name from customer where zip-code="12345" and create-time<200 AND (record delete time IS NULL OR record-delete-time>500).

This approach may have the benefit that no additional second data container (e.g., second data container 130) has to be created and the computational overhead associated with the creation of a second data container may be avoided.

According to some embodiments, DBMS 132 provides a control function. The control function may be implemented as hardware logic. The control function may be configured for allowing the received database query to selectively access the data records of the plurality of data records 134 contained in first data container 116 whose assigned create-time is later than the most recent full-delete-time stored in association with first data container 116. For example, step 206 (see FIG. 2) may be performed by said control function which may correspond to a MVCC visibility function while steps 202 and 204 may be implemented by other modules of DBMS 132. DBMS 132 may perform the control function in response to the receiving of the database query. In some embodiments, the performing of the control function includes reading the full-delete-time (e.g., full-delete-time 138) indicating the time the most recent full delete operation was performed on first data container 116; selectively allowing the database query to access any one of the data records of the plurality of data records 134 of first data container 116 whose assigned create-time (see FIG. 1, column 124) is later than the read most recent full-delete-time; and selectively denying the database query to access to any data records of the plurality of data records 134 of first data container 116 whose assigned create-time is earlier than the read most recent full-delete-time (e.g., full-delete time 138).

Thereby, the selective giving of access to the data records of the plurality of data records 134 contained in first data container 116, whose assigned create-time is later than the most recent full-delete-time (e.g., full-delete-time 138) stored in association with first data container 116 may be achieved.

Implementing the control function as hardware logic may accelerate the speed of performing the logical delete process. The hardware logic may be, for example, an integrated circuit (e.g., a processor which has MVCC visibility-related instructions, implemented using special hardware gates). Hardware gates might be defined using Very High Speed Integrated Circuit Hardware Description Language (VHDL) or other hardware description languages. "Visibility-related instructions" as used herein are instructions which control if a particular database statement is allowed to become aware of the existence of a particular data record or not. Said control may be imposed (e.g., DBMS 132 and/or an MVCC logic contained in or coupled to DBMS 132). A "data record visible to a particular statement" as used herein is a data record whose existence is communicated to said statement. A data record not being visible to a particular statement is a data record whose existence is hidden from said statement, with the result being that said statement may be neither aware of the existence of said record nor may access said data record. Hardware logic can be implemented as, for example, a field programmable gate array (FPGA).

According to some embodiments, the control function is implemented as software logic.

According to embodiments, DBMS 132 is configured for controlling concurrent access to the data of first data containers (e.g., first data container 116) via MVCC logic. In some embodiments, the MVCC logic, or another background process, may periodically execute a physical delete operation to sweep through and delete old, and/or obsolete data records, thereby evaluating—among other aspects—the one or more full-delete-times (e.g., full-delete-times 134, 136) associated with each data container (e.g., first data container 116) to determine if a data record, or block of data records, of the plurality of data records 134 should be deleted.

According to some embodiments, hardware or software based control function is implemented as an MVCC visibility function of the MVCC logic. First data container 116 may be an MVCC enabled table and the full-table delete time is stored as a single data value in association with said MVCC enabled table. In case multiple full delete operations are performed on first data container 116, multiple full-delete-times may be stored in association with first data container 116 and may be used and evaluated by the MVCC logic whenever data shall be accessed in order to selectively give a query access to data records belonging to a particular version. In some embodiments, the time interval between individual full delete operations performed on one or more first data containers (e.g., first data container 116) in parallel may constitute a set of data records belonging to the same version.

DBMS 132 may be configured to manage a plurality of first data containers (e.g., first data container 116). DBMS 132 may include at least one full-delete-time table 115. Full-delete-time table 115 includes, for each of the first data containers (e.g., first data container 116), one or more single data values assigned to first data container 116, each single data value being a full-delete-time indicative of a moment in time when a full delete operation was performed on the respectively assigned first data container (e.g., first data container 116). The full-delete-time is stored in full-delete-time table 115. In some embodiments, full-delete-time table 115 is an MVCC table, i.e., an additional table used by a MVCC functionality to provide multi-version control.

According to some embodiments, the method may further include: in response to receiving a request to delete one of the data records of the plurality of data records 134 of first data container 116, storing a current time as a record-delete-time in association with said data record of the plurality of data records 134; in response to receiving the database query directed at first data container 116, evaluating the one or more single-valued full-delete-times associated with first data container 116, the create-times and the record-delete-times, if any, associated with the data records of the plurality of data records 134 of first data container 116 and selectively granting access to the data records of the plurality of data records 134 contained in first data container 116 that fulfill the following requirements: a) the create-time (see FIG. 1, column 124) associated with the data record of the plurality of data records 134 is later than the most recent full-delete-time 138 stored in association with first data container 116; and b) the data record of the plurality of data records 134 lacks an assigned record-delete time. The combination of the create-time and the record-delete time may provide for a validity interval of the data record.

According to some embodiments, the step of selectively granting or denying access to a particular data record of the plurality of data records 134 includes evaluating the one or more full-delete-time times (e.g., full-delete-times 136, 138) associated with first data container 116 that make up said data record, evaluating the create-time of said data record and evaluating the record-delete-time of said data record. DBMS 132 grants the received query access to the data record if the create-time of the data record is later than the most recent full-delete-time (e.g., full-delete-time 138) of first data container 116 and if the data record does not have assigned a record-delete-time that is prior to the execution time of the received database query to which access to said data record shall be granted or denied.

For example, the received database query may be executed in a transaction having the transaction-ID 324. The query may be directed at first data container 116 having assigned the full-delete-times of 100 and 200 (e.g., full-delete-times 136, 138), whereby 100 and 200 are identifiers of transactions having performed a full delete operation on first data container 116 in the past. A first data record of the plurality of data records 134 may have an assigned create-time of 202 (a transaction ID of a transaction having created the first data record) and a record-delete time 228. A second data record of the plurality of data records 134 may have assigned the create-time of 207 (a transaction ID of the transaction having created the second data record) and may not have assigned any record-delete time. In such an example, DBMS 132 may grant the received query access to the second data record, because the create-time of 207 is later than the most recent full-delete-time of 200 and the second data record does not have assigned a record-delete time that lies before the execution time (i.e., transaction-ID: 324) of the received database query. However, DBMS 132 may deny the received query access to the first data record, because the first data record has an assigned record-delete time of 228 which is prior to the execution time (i.e., transaction-ID: 324) of the received database query. Thus, the received query, when scanning first data container 116, will "see" the second data record, but not the first data record, because the first data record is in a "logically deleted" state in respect to the received query.

Some embodiments, as described, are implemented in a DBMS (e.g., DBMS 132) which provides MVCC functionality. The evaluation as to whether a data record of the plurality of data records 134 has an assigned record-delete time which is prior to the execution time of the received database query may be used in DBMSs that provide MVCC support. In such DBMSs, a database query may have assigned a transaction-ID being indicative of a moment in time that lies in the past. Several data records may have assigned a record-delete-time which comes after the execution time of the received database query. Such data records will not be considered as logically deleted, because the record deletion operation was performed in the MVCC-DBMS after the receiving and execution of the database query. For example, the database query may be directed at a version of the data that is several days or month old.

According to some embodiments, DBMS 132 physically deletes multiple data records of the plurality of data records 134 of first data container 116. Such physical deletion may include: identifying the oldest one of one or more read and/or write transactions currently accessing first data container 116. In alternative implementation variants, the oldest one of all transactions currently accessing any one of the first data containers (e.g., first data container 116) managed by DBMS 132 are identified. The question of if the oldest currently executed transaction is identified for the particular first data container (e.g., first data container 116) to be physically deleted or is identified globally for all first data containers of DBMS 132 may depend on the particularities of the type of DBMS used, e.g. on the question which of the two options may be performed faster. The oldest identified transaction may comprise any combination of read data manipulation language (DML) statements, in particular SELECT statements, and/or write data manipulation language statements such as, for example, UPDATE or INSERT statements. Such physical deletion may also include: identifying a threshold time, the threshold time being indicative of the most recent full-delete-time (e.g., full-delete-time 138) assigned to first data container 116 at the moment when starting the identified oldest transaction; evaluating the create-time values (see FIG. 1, column 124) assigned to each data record of the plurality of data records 134 of first data container 116; and/or selectively physically deleting the data records of the plurality of data records 134 of first data container 116 whose assigned create-time is earlier than the identified threshold time.

The physical deletion may free occupied storage space which is no longer required. Separating the logical delete operation, which can be executed very quickly by storing a single value as the most recent full-delete time of first data container 116, from a physical delete operation, which may be executed at a later moment in time, may be beneficial because the physical delete operation may take much more time and may in some cases include accessing each data record that is to be physically deleted, individually. However, as the physical delete process is executed asynchronous to the logical delete operation, other database operations succeeding the logical delete operations are not delayed by the physical delete process. Identifying the threshold time may ensure that no data records are physically deleted which are still accessed by an ongoing transaction.

In case no transactions are performed when DBMS 132 performs a physical delete operation, DBMS 132 uses the most recent full-delete-time (e.g., full-delete-time 138) identified upon starting the physical delete operation as the threshold time. In some embodiments, the physical delete operation is executed on a regular basis, such as according to a specified time interval. A physical delete operation is an operation which recovers disk space which is occupied by logically deleted data records of the plurality of data records 134. In comparison, the full delete operation on first data container 116 may not physically remove an old data record, or an old version thereof in a MVCC system, from first data container 116. For example, the physical delete operation may be implemented as an SQL "GROOM table" command. Users can do tasks such as SELECT, UPDATE, DELETE, and INSERT operations while the physical delete operation is taking place.

According to embodiments, multiple second data containers (e.g., second data container 130), e.g. multiple database views, may exist for accessing data records of the plurality of data records 134 of a particular first data container (e.g., first data container 116). In such an embodiment, the physical delete operation may only be performed on first data container 116 if the data records to be deleted are not accessible ("visible") via any currently existing view still being used and acting as a second data container (e.g., second data container 130).

According to some embodiments, the physical delete operation is implemented as a sequential scanning of data records of first data container 116 for identifying and physically deleting the data records of the plurality of data records 134 which had already been logically deleted and which are not currently accessed by a DML statement.

Figure 3:
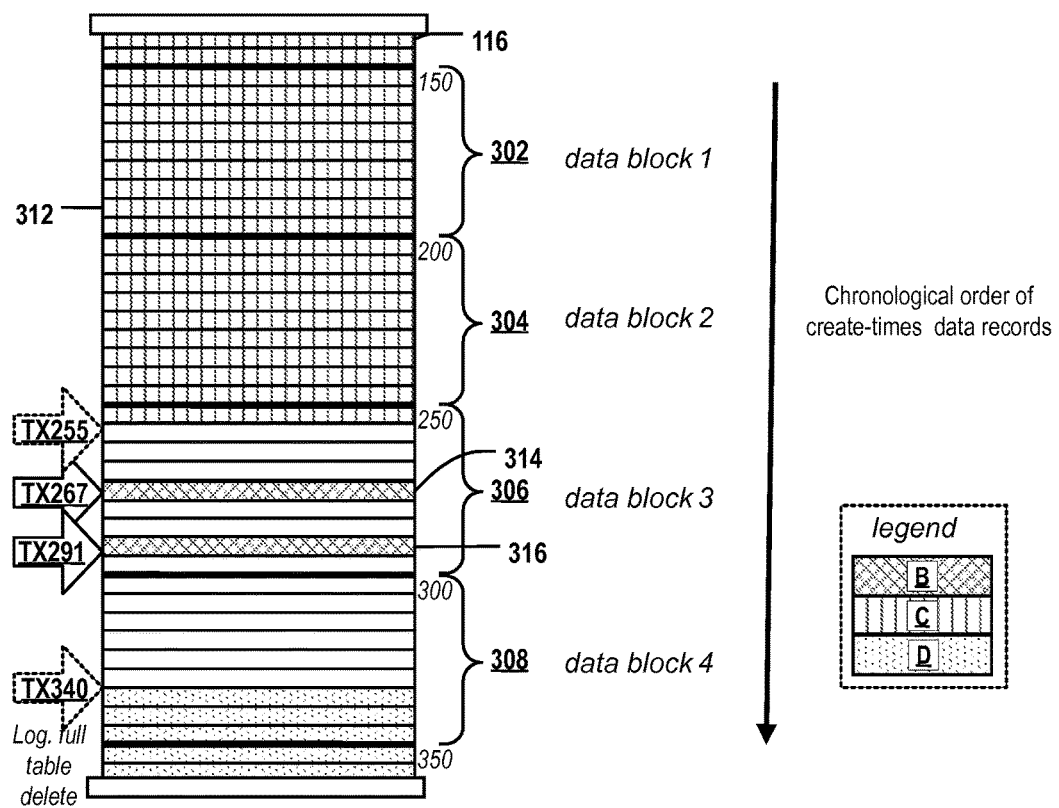
FIG. 3 depicts data blocks of a first data container according to an embodiment of the present invention.

According to other embodiments as depicted, for example, in FIG. 3, the method includes executing a data-block-wise physical delete operation on first data container 116. First data container 116 includes a plurality of data blocks (e.g., data blocks 302, 304, 306, and 308). Each data block includes multiple data records of the plurality of data records 134 of first data container 116. Each data block has an assigned block-start-time. The block-start-time is the create-time of the data record of the data block having the latest create-time of all data records of said data block. The method may further include: performing, by DBMS 132 or logic therein, a physical delete operation for physically deleting the data records of one or more of the data blocks of first data container 116; and the physical delete operation includes, for each of the data blocks of first data container 116: identifying the oldest transaction of all transactions currently accessing first data container 116; alternatively, the oldest transaction of all transactions currently accessing any one of all first data containers managed by DBMS 132 is identified. For example, the question of if the oldest currently executed transactions is identified for the particular first data container to be physically deleted or is identified globally for all first data containers of DBMS 132 may depend on, for example, the particularities of the type of DBMS used. The physical delete operation may further include identifying a threshold time, the threshold time being indicative of the most recent full-delete-time (e.g., full-delete-time 138) assigned to first data container 116 at the moment when starting the identified oldest transaction; identifying the block-start-time of the data block; for example, the block-start-time may be the transaction ID of the write-transaction having updated or inserted the latest data record of said data block and having thereby created the create-time of said data record; said transaction-ID may have been used and stored as the create-time of said data record. Preferentially, the block-start-time is read from metadata of said data block. The physical delete operation may further include selectively physically deleting the data block if the identified block-start-time is older than the identified threshold time; and skipping the physical deletion of the data block if the identified block-start-time is later than the identified threshold time.

If no transactions are performed when DBMS 132 performs the block-wise physical delete operation, DBMS 132 uses the most recent full-delete-time (e.g., full-delete-time 138) identified upon starting the physical delete operation as the threshold-time.

The block-wise physical delete operation may further increase the performance, because it is not necessary to evaluate the create-time of each individual data record of a data block. Maintaining and evaluating a block-specific block-start-time may allow identifying data blocks whose block-start-time is older than the identified threshold time. This indicates that said data block does not comprise a data record that is currently accessed by a concurrent transaction which has still not completed. If the block-start-time is later than the threshold-time, said data block may comprise a data record that is currently accessed by a concurrent transaction. In this case, the currently evaluated data block is not physically deleted. Rather, the next data block is evaluated.

According to said embodiments, it is not necessary to evaluate multiple "delete markers" per logical full-table delete but only one per logical full-table delete and first data container (e.g., first data container 116).

According to some embodiments, physical delete operation are performed by DBMS 132 selectively for physically deleting data blocks of first data containers (e.g., first data container 116) on which a logical full delete operation was performed previously, while a physical delete for data records having been logically deleted on an individual basis are omitted.

The physical delete operation is implemented, according to some embodiments, as a function capable of accessing block metadata of first data container 116. The block metadata is metadata which is indicative of the data records stored in respective data blocks 302 through 308 of first data container 116. A "data block" may be a segment of the main memory (e.g., memory 108) or of a non-volatile storage device preserved for storing a predefined amount of data. Each data block may have assigned a block-ID and may have assigned the create-time of the oldest data record contained in said data block. The create-time of the latest data record contained in a block is referred to herein as a "block-start-time." Preferentially, the block-start-times of each data block are stored in data block-specific metadata. For example, the block-start-time may be stored in the metadata of the block upon creating the first data record of said data block. This may allow the block-start-time to be derived quickly, e.g. when performing a physical delete operation on a data container comprising said data block, by reading a precalculated data value from the metadata rather than sequentially evaluating the create times of all data records in a data block.

According to some embodiments, the block-wise physical delete operation is executed as an asynchronous process with respect to the logical delete operation, i.e., is executed regularly, preferentially in the background and/or at times of reduced system load.

Typically, at least some of the data blocks consist of data records having assigned a chronological sequence of create-times and which are stored in contiguous memory or data storage elements. This may be the case when the majority of create-time-values is derived from INSERT commands and only a minority of data records are affected by an UPDATE operation resulting in a create-time-value that is later than the INSERT operation which created the record.

Preferentially, the one or more data blocks to be physically deleted are physically deleted without sequentially scanning each data record contained in said data blocks. For example, the single-step physical delete operation can be performed by using the block-IDs of the blocks having been identified as physically deletable for quickly identifying and accessing the data blocks and deleting all their records in a single step. For example, DBMS 132 may store for every data block a memory or storage address of the latest data record of said block. Said address may be used as base address when calculating offset information for all the subsequent, contiguously stored data records of said data block and optionally also for calculating offset information for consecutive data blocks which have been determined to be physically deletable. The memory or storage location of the last record of said data block that is to be physically deleted can be calculated quickly, e.g. by multiplying the number of consecutive data records contained in said block and the data record size. If multiple consecutive data blocks, for example data blocks 302 and 304, shall be physically deleted, the base address of the first data record of the first data block (e.g., data block 302) is determined. In addition, the memory or storage location of the last record in said sequence of consecutive data blocks which are to be deleted can be calculated quickly e.g. by multiplying the number of consecutive data blocks to be deleted and the data block size. The data block size can be calculated by multiplying the number of data records per data block with the data record size. As a result, scanning of data blocks for deleting the data records individually is unnecessary.

For example, in the embodiment depicted in FIG. 3, first data container 116, e.g. a database table, may comprise multiple data blocks 302, 304, 306, 308. Each data block has assigned in its metadata a block-start-time. For example, block 302 may have assigned block-start-time 150, which may correspond to a transaction TX150 having created the youngest data record of said block 302. Data block 304 may have assigned block-start-time 200 corresponding to a transaction TX200 having created the latest data record of block 304, and so on. When the physical delete operation is performed, there may be two transactions, for example, TX267 and TX291, still operating on first data container 116, whereby the identified oldest transaction is transaction TX267. DBMS 132 keeps track of data blocks of a data record which are currently accessed by a transaction. For example, the data records 314 and 316, marked by the hatching "B" (see FIG. 3, legend) are currently accessed by transactions TX267 and TX291 respectively comprising one or more DML statements operating on said data records. Transaction TX255 is the transaction having performed the most recent logical full delete operation on first data container 116 at the moment when the identified oldest transaction TX267 started executing. Thus, transaction-ID 255 may be identified as the threshold-time, because it reflects the most recent full-delete-time associated with first data container 116 at the moment when the identified oldest DML statement TX267 started executing. If a physical delete operation is performed on the level of individual data records, all data records whose create-time is older than the identified threshold time TX255 are physically deleted. Thus, data records having a create-time 250 through 254 (specified in transaction-IDs of the respective INSERT transactions), if any, of block 306 and all data records of blocks 302 and 304 are physically deleted. All data records allowed to be physically deleted when performing a per-record physical delete are indicated by the hatching "C."

If, however the physical deletion is executed in a block-wise manner, no data record of block 306 is deleted and all data records of blocks 302 and 304 may be physically deleted, preferentially in a single delete action per block or per sequence of adjacent blocks. For example, each of blocks 302 and 304 can be deleted very quickly by merely identifying the identifier of the latest data record of the data block to be deleted, e.g. data record created at time 200 for data block 304. Said record identifier may be, for example, an address being used as a base address for calculating offset information. Block 306 is not deletable because it comprises currently accessed data records. Block 308 is not deletable because its block-start-time 300 is later than the threshold-time TX255.

For example, a regularly executed background process for performing physical delete operations could perform the following logic, specified as pseudo code:

for every first data container (a):
    identify the oldest transaction "OT" still being executed and running on the database or running on the individual first data container to be physically deleted;
    identify a further full-delete-time "FMRFDT($a_{OT}$)" associated with the data container a, the further full-delete-time FMRFDT($a_{OT}$) being the most recent full-delete-time at the moment when the identified oldest still executed transaction OT started execution;
    for every data block of the first data container a with blockNumber b:
        if (block-start-time(b) is older than "FMRFDT($a_{OT}$)") physically delete block b;
    end Thereby, the blockNumber acts as an identifier of a block, i.e., a "block-ID"; the block-start-time(blockNumber) indicates the create-time of the latest data record contained in data block blockNumber. The physical deletion implies deallocating storage space from all data records of the physically deleted data block b.

In the example depicted in FIG. 3, transaction TX267 is the oldest concurrently executed transaction for data container 116. The most recent full-delete-time associated with data container 116 "seen" by transaction TX267 is the transaction-ID TX255 or a starting time of said transaction TX255 determined by a clock. Said most recent full-delete-time is identified as the threshold time up to which a physical delete may be executed.

The transaction-ID TX340 is not identified as the threshold-time for the current physical delete operation described above, but may be identified as a threshold time of a later executed physical delete routine. Thus, the transaction-ID of TX340 may act as a threshold-time in a later executed physical delete operation. The data records which are not logically deleted at said later physical delete operation and which are also not allowed to be physically deleted because their create-time is later than the threshold-time identified for said later physical delete operation are indicated by hatching "D". Thus, a full delete operation logically deletes all data records with a create-time before starting said full delete operations. So those records not logically deleted at TX340 point in time are also not allowed to be physically deleted.

The block-wise physical deletion of multiple data records may lead to a rapid regain of storage or memory space in a single operation without having to perform a sequential scan of the data records. Rather, the data records which can safely be physically deleted are identified via their block-IDs. This feature may be particularly advantageous in a DBMS where the majority of data records are sequentially inserted to the same first data container such that they are mostly stored in a contiguous storage and memory space and where the create-times of said data records is not modified by a later UPDATE statement.

Usually, the data records of a data block are ordered according to their create-times and are stored in a contiguous memory or storage space. Thus, in case a data block is physically deleted, the contiguous storage space to be regained can be identified very quickly without performing a sequential scan of the data records to be physically deleted.

According to embodiments, the physical delete operation is performed asynchronous to the logical delete operation. For example, the logical delete operation may be triggered by a DELETE FROM TABLE command and the physical delete operation may be performed later, e.g. in response to a regularly executed GROOM TABLE command or any other regularly executed physical delete command, or at time of low utilization, to clean up the system.

A "full delete operation" as used herein is a process that deletes all data records in a data container, e.g. in a database table, a materialized database view, or a partition of a database table.

A "full-delete-time" as used herein is a data value being indicative of the time when a full delete operation was executed on a particular data container. For example, said time may be a time provided by a clock when a transaction which performed the full delete operation committed. According to another example, the full-delete-time may be a transaction-ID of the transaction which performed the full delete operation.

A "record-delete-time" as used herein is a data value being indicative of the time when a delete operation was executed on a particular data record. For example, said time may be a time provided by a clock when a transaction which performed a record-specific DELETE statement committed. According to another example, the record-delete-time may be a transaction-ID of the transaction which performed the record-specific DELETE statement. A "create-time" as used herein is a data value being indicative of the time when a data record was created or modified, e.g. by means of an INSERT or UPDATE statement. For example, said time may be a time provided by a clock when a transaction which performed the INSERT or UPDATE statement committed. According to another example, the create-time may be a transaction-ID of the transaction which performed the INSERT or UPDATE statement.

A "current time" as used herein is a data value being indicative of the time when a particular operation or function that determines said data value is executed. For example, the current time determined by a full delete operation is a moment in time when said full delete function executes.

A "schema definition" as used herein is the definition of the structure of a data container, e.g. a database table, the definition being provided in a formal language supported by the DBMS. In a relational database, a schema definition may specify the table name, the columns contained therein, and the relationships between columns and tables.

A "data container" as used herein is a data structure used for storing and/or dynamically retrieving data in a structured manner. A data container may be, for example, a database table, a materialized view or a "conventional", non-materialized database view. According to some embodiments, first data containers are database tables, materialized or non-materialized database views or files managed by a DBMS or a mixture thereof. According to some embodiments, second data containers are data containers which are created dynamically in response to a database query. According to some embodiments, second data containers may be implemented as non-materialized database views.

A "catalogue" or "database catalogue" as used herein is a component of a database management system that comprises metadata in which definitions of database objects such as base tables, views, synonyms, value ranges, indexes, users, and user groups are stored.

A "logical delete" as used herein is an operation which results in a hiding of a logically deleted data record from standard DML statements succeeding the logical delete operation. However, the information of the logically deleted data record is maintained and can be recovered by special tools and functions.

A "physical delete" as used herein is an operation which results in regaining the storage space occupied by the physically deleted data record for other purposes. Typically, the physical deletion of the information of a data record is performed such that information recovery is made impossible.

Referring to FIG. 1, FIG. 1 shows a computer program product for operating a database management system 132. The computer program product comprises a computer readable storage medium (e.g., storage 106) having program instructions embodied therewith, the program instructions executable by a processor 104 to cause the processor to execute a method according to the previous description.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following clauses describe possible combinations of features:

1. A method for processing data in a database management system, the method comprising:
performing, by one or more processors, a delete operation on a first data container, wherein the first data container includes one or more data records and wherein the delete operation logically deletes at least one data record of the one or more data records;
associating, by one or more processors, a time of the performed delete operation with the first data container;
performing, by one or more processors, a write operation on a first data record of the first data container;
associating, by one or more processors, a time of the performed write operation with the first data record of the first data container; and
responsive to receiving a database query directed at the first data container, granting access to, by one or more processors, the first data record of the first data container based on, at least, the time of the performed write operation being chronologically after the time of the performed delete operation.

2. The method of claim 1, wherein the first data container is a database table and the delete operation is a full-table delete operation selectively performed on the first data container.

3. The method of claim 1, wherein the first data container is a database table partition and the delete operation is a full-partition delete operation selectively performed on the first data container.

4. The method of claim 1, wherein the first data container comprises a plurality of data blocks, wherein one or more data blocks of the plurality of data blocks include data records of the one or more data records, and wherein each respective data block including data records of the one or more data records has an associated time indicating the most recently created data record stored in the data block.

5. The method of claim 4, wherein performing the delete operation on the first data container comprises:
performing, by one or more processors, a physical delete operation on the one or more data blocks of the plurality of data blocks, wherein the physical delete operation comprises, for each respective data block of the one or more data blocks:
identifying, by one or more processors, the most recent data record of the data block, based on times associated with each respective data record stored in the data block;
comparing, by one or more processors, the time associated with the most recent data record stored in the data block to the time of the performed delete operation; and
responsive to the time associated with the most recent data record stored in the data block being chronologically before the time of the performed delete operation, physically deleting, by one or more processors, the data block.

6. The method of claim 1, wherein the time of the performed delete operation is a current time and date value when performing the delete operation; and
wherein the time of the performed write operation is a current time and date value when performing the write operation.

7. The method of claim 1, wherein the time of the performed delete operation is a transaction-identification (ID) associated with the performed delete operation;
wherein the time of the performed write operation is a transaction-ID associated with the performed write operation; and
wherein each transaction-ID is chronologically ordered with a unique number.

8. The method of claim 1, further comprising:
responsive to receiving the database query directed at the first data container, creating, by one or more processors, a second data container, wherein the second data container includes extracted data records from the first data container, wherein each extracted data record has an associated time chronologically after the time of the performed delete operation; and wherein granting access to the first data record of the first data container comprises:
writing, by one or more processors, an alternate database query, such that the alternate database query accesses the second data container; and
executing, by one or more processors, the alternate database query.

9. The method of claim 8, wherein a schema definition of the second data includes, at least, the time of the performed delete operation.

10. The method of claim 1, wherein the time of the performed delete operation is a single data value.

11. The method of claim 1, wherein granting access to the first data record of the first data container comprises:
retrieving, by one or more processors, the time of the performed delete operation;
writing, by one or more processors, an alternate database query, wherein the alternate database query specifies a condition that is to be met by each respective data record in order to provide access to each respective data record, wherein the condition specifies that a time of the performed write operation for the respective data record is chronologically after the time of the performed delete operation; and
executing, by one or more processors, the alternate database query.

12. The method of claim 1, further comprising:
associating, by one or more processors, the time of the performed delete operation with the at least one data record of the one or more data records; and
wherein granting access to the first data record of the first data container is further based on the first data record being unassociated with the time of the performed delete operation.

13. A computer program product for processing data in a database management system, the computer program product comprising:
one or more computer readable storage media and program instructions stored on the one or more computer readable storage media, the program instructions comprising:
program instructions to perform a delete operation on a first data container, wherein the first data container includes one or more data records and wherein the delete operation logically deletes at least one data record of the one or more data records;
program instructions to associate a time of the performed delete operation with the first data container;
program instructions to perform a write operation on a first data record of the first data container;
program instructions to associate a time of the performed write operation with the first data record of the first data container; and
program instructions to, responsive to receiving a database query directed at the first data container, grant access to the first data record of the first data container based on, at least, the time of the performed write operation being chronologically after the time of the performed delete operation.

14. A computer system for processing data in a database management system, the computer system comprising:
one or more computer processors, one or more computer readable storage media, and program instructions stored on the one or more computer readable storage media for execution by at least one of the one or more processors, the program instructions comprising:
program instructions to perform a delete operation on a first data container, wherein the first data container includes one or more data records and wherein the delete operation logically deletes at least one data record of the one or more data records;
program instructions to associate a time of the performed delete operation with the first data container;
program instructions to perform a write operation on a first data record of the first data container;
program instructions to associate a time of the performed write operation with the first data record of the first data container; and
program instructions to, responsive to receiving a database query directed at the first data container, grant access to the first data record of the first data container based on, at least, the time of the performed write operation being chronologically after the time of the performed delete operation.

What is claimed is:
1. A computer program product for processing data in a database management system, the computer program product comprising:
one or more computer readable storage media, wherein the one or more computer readable storage media is not a transitory signal per se, and program instructions stored on the one or more computer readable storage media, the program instructions comprising:
program instructions to perform a delete operation on a first data container, wherein the first data container includes one or more data records and wherein the delete operation logically deletes at least one data record of the one or more data records;
program instructions to associate a time of the performed delete operation with the first data container;
program instructions to perform a write operation on a first data record of the first data container;
program instructions to associate a time of the performed write operation with the first data record of the first data container; and
program instructions to, responsive to receiving a database query directed at the first data container, grant access to the first data record of the first data container based on, at least, the time of the performed write operation being chronologically after the time of the performed delete operation, and create a second data container, wherein:
the second data container includes extracted data records from the first data container;
each extracted data record has an associated time chronologically after the time of the performed delete operation; and
program instructions to grant access to the first data record of the first data container comprise:
program instructions to write an alternate database query, such that the alternate database query accesses the second data container; and
program instructions to execute the alternate database query.

2. The computer program product of claim 1, wherein the first data container is a database table and the delete operation is a full-table delete operation selectively performed on the first data container.

3. The computer program product of claim 1, wherein the first data container is a database table partition and the delete operation is a full-partition delete operation selectively performed on the first data container.

4. The computer program product of claim 1, wherein the first data container comprises a plurality of data blocks, wherein one or more data blocks of the plurality of data blocks include data records of the one or more data records, and wherein each respective data block including data records of the one or more data records has an associated time indicating the most recently created data record stored in the data block.

5. The computer program product of claim 4, wherein program instructions to perform the delete operation on the first data container comprise:
   program instructions to perform a physical delete operation on the one or more data blocks of the plurality of data blocks, wherein the physical delete operation comprises, for each respective data block of the one or more data blocks:
      program instructions to identify the most recent data record of the data block, based on times associated with each respective data record stored in the data block;
      program instructions to compare the time associated with the most recent data record stored in the data block to the time of the performed delete operation; and
      program instructions to, responsive to the time associated with the most recent data record stored in the data block being chronologically before the time of the performed delete operation, physically delete the data block.

6. The computer program product of claim 1, wherein the time of the performed delete operation is a current time and date value when performing the delete operation; and
   wherein the time of the performed write operation is a current time and date value when performing the write operation.

7. The computer program product of claim 1, wherein the time of the performed delete operation is a transaction-identification (ID) associated with the performed delete operation;
   wherein the time of the performed write operation is a transaction-ID associated with the performed write operation; and
   wherein each transaction-ID is chronologically ordered with a unique number.

8. The computer program product of claim 1, wherein a schema definition of the second data includes, at least, the time of the performed delete operation.

9. The computer program product of claim 1, wherein the time of the performed delete operation is a single data value.

10. The computer program product of claim 1, wherein program instructions to grant access to the first data record of the first data container comprise:
    program instructions to retrieve the time of the performed delete operation; and
    program instructions to execute the alternate database query; and
    wherein the alternate database query specifies a condition that is to be met by each respective data record in order to provide access to each respective data record, wherein the condition specifies that a time of the performed write operation for the respective data record is chronologically after the time of the performed delete operation.

11. The computer program product of claim 1, further comprising:
    program instructions, stored on the one or more computer readable storage media, to associate the time of the performed delete operation with the at least one data record of the one or more data records; and
    wherein program instructions to grant access to the first data record of the first data container is further based on the first data record being unassociated with the time of the performed delete operation.

12. A computer system for processing data in a database management system, the computer system comprising:
    one or more computer processors, one or more computer readable storage media, and program instructions stored on the one or more computer readable storage media for execution by at least one of the one or more processors, the program instructions comprising:
    program instructions to perform a delete operation on a first data container, wherein the first data container includes one or more data records and wherein the delete operation logically deletes at least one data record of the one or more data records;
    program instructions to associate a time of the performed delete operation with the first data container;
    program instructions to perform a write operation on a first data record of the first data container;
    program instructions to associate a time of the performed write operation with the first data record of the first data container; and
    program instructions to, responsive to receiving a database query directed at the first data container, grant access to the first data record of the first data container based on, at least, the time of the performed write operation being chronologically after the time of the performed delete operation, and create a second data container, wherein:
       the second data container includes extracted data records from the first data container;
       each extracted data record has an associated time chronologically after the time of the performed delete operation; and
       program instructions to grant access to the first data record of the first data container comprise:
          program instructions to write an alternate database query, such that the alternate database query accesses the second data container; and
          program instructions to execute the alternate database query.

13. The computer system of claim 12, wherein the first data container is a database table and the delete operation is a full-table delete operation selectively performed on the first data container.

14. The computer system of claim 12, wherein the first data container is a database table partition and the delete operation is a full-partition delete operation selectively performed on the first data container.

15. The computer system of claim 12, wherein the first data container comprises a plurality of data blocks, wherein one or more data blocks of the plurality of data blocks include data records of the one or more data records, and wherein each respective data block including data records of the one or more data records has an associated time indicating the most recently created data record stored in the data block.

16. The computer system of claim 15, wherein program instructions to perform the delete operation on the first data container comprise:
    program instructions to perform a physical delete operation on the one or more data blocks of the plurality of data blocks, wherein the physical delete operation comprises, for each respective data block of the one or more data blocks:
- program instructions to identify the most recent data record of the data block, based on times associated with each respective data record stored in the data block;
- program instructions to compare the time associated with the most recent data record stored in the data block to the time of the performed delete operation; and
- program instructions to, responsive to the time associated with the most recent data record stored in the data block being chronologically before the time of the performed delete operation, physically delete the data block.

17. The computer system of claim 12, wherein the time of the performed delete operation is a current time and date value when performing the delete operation; and
- wherein the time of the performed write operation is a current time and date value when performing the write operation.

18. The computer system of claim 12, wherein the time of the performed delete operation is a transaction-identification (ID) associated with the performed delete operation;
- wherein the time of the performed write operation is a transaction-ID associated with the performed write operation; and
- wherein each transaction-ID is chronologically ordered with a unique number.

\* \* \* \* \*